(12) United States Patent
Pugsley

(10) Patent No.: US 8,570,694 B2
(45) Date of Patent: Oct. 29, 2013

(54) LOW VOLTAGE ELECTROSTATIC DISCHARGE PROTECTION

(75) Inventor: William Pugsley, Cambridge (GB)

(73) Assignee: Cambridge Silicon Radio Limited, Cambridge (GB)

( * ) Notice: Subject to any disclaimer, the term of this patent is extended or adjusted under 35 U.S.C. 154(b) by 204 days.

(21) Appl. No.: 13/121,987

(22) PCT Filed: Oct. 7, 2009

(86) PCT No.: PCT/EP2009/063060
§ 371 (c)(1),
(2), (4) Date: Jun. 20, 2011

(87) PCT Pub. No.: WO2010/049245
PCT Pub. Date: May 6, 2010

(65) Prior Publication Data
US 2012/0075758 A1 Mar. 29, 2012

(30) Foreign Application Priority Data

Oct. 31, 2008 (GB) .................................. 0820051.1

(51) Int. Cl.
*H02H 9/00* (2006.01)
*H02H 3/20* (2006.01)
*H02H 3/22* (2006.01)
(52) U.S. Cl.
USPC ............................. 361/56; 361/91.1; 361/111

(58) Field of Classification Search
USPC ............................. 361/56, 111, 91.1
See application file for complete search history.

(56) References Cited

U.S. PATENT DOCUMENTS

| 5,771,140 | A | 6/1998 | Kim |
| 5,990,723 | A | 11/1999 | Tanase |
| 6,014,298 | A | 1/2000 | Yu |
| 6,249,410 | B1 * | 6/2001 | Ker et al. ......................... 361/56 |
| 7,110,228 | B2 * | 9/2006 | Chang ............................. 361/56 |

FOREIGN PATENT DOCUMENTS

GB        2227898 A    8/1990

* cited by examiner

*Primary Examiner* — Jared Fureman
*Assistant Examiner* — Lucy Thomas
(74) *Attorney, Agent, or Firm* — Novak Druce Connolly Bove + Quigg LLP; Vincent M DeLuca

(57) ABSTRACT

A protection circuit for protecting components from an electrostatic discharge at a node in an integrated circuit having a first set of electronic components of a first voltage sensitivity, the protection circuit comprising: detection circuitry arranged to detect an electrostatic discharge at the node; a first switching device connected between the first set of components and the node; and a second switching device connected between the node and ground; wherein, when an electrostatic discharge is detected at the node, the first switching device is configured to isolate the first set of components from the node and the second switching device is configured to provide a current path from said node to ground.

21 Claims, 2 Drawing Sheets

LOW VOLTAGE ELECTROSTATIC DISCHARGE PROTECTION

BACKGROUND OF THE INVENTION

This invention relates to a circuit for protecting voltage-sensitive components in an integrated circuit from an electrostatic discharge or other source of potentially damaging overvoltage. In particular, this invention relates to a circuit for protecting voltage-sensitive components or circuits in an integrated circuit (IC) which are insufficiently protected by conventional electrostatic discharge (ESD) clamps.

In order to protect an integrated circuit from a potentially damaging electrostatic discharge, it is commonplace to provide an ESD clamp between the power supply rail and ground to which the integrated circuit is coupled. During an ESD event, an ESD clamp placed across the power supply of a circuit provides a safe current path through the chip and around the circuit being protected. When an ESD events occurs, the ESD clamp acts to conduct the electrostatic charge to ground, thus dissipating the overvoltage at the power supply rail. The ESD clamp is configured to trigger when an ESD event is detected at the supply rail and then subsequently limit the voltage to below the lowest failure voltage of all the components in the circuit. In this way the designer of the circuit can guarantee that none of the components in the circuit will be damaged during an ESD event.

Typically, ESD clamps that clamp to higher voltages during an ESD event are also tolerant to higher voltages during normal operation. Conversely high performance clamps that can clamp to a lower voltage, and therefore protect more sensitive components, are generally tolerant only up to lower power supply voltages. It is for some circuits possible to design power supply clamps with high power supply voltage tolerance and low clamping voltage but these clamps are significantly larger and have a higher leakage current during normal operation.

In some instances it can be useful to design circuits which are powered from relatively high voltage power supplies yet contain high performance components (such as thin oxide transistors, low voltage diodes, n-well resistors, thin gate oxide capacitors or other low voltage components) that cannot be protected by a high voltage clamp. During normal operation the circuit is configured such that these high performance components operate at voltages within their safe operating range, but during an ESD event it is not possible to ensure that the maximum clamped voltage is not applied across any given component.

This can occur in practice when power supply clamps suitable for thick oxide (double oxide or DO) MOSFETs are used to protect circuits that comprise thin oxide (single oxide or SO) MOSFETs, or circuits comprising a mix of SO and DO transistors.

Conventionally, low voltage components are often protected simply by adding resistors between the components and the power supply, thus limiting the current through and the voltage across those components during the ESD event. However, in many circuits such a resistor configuration cannot be used as they limit the current through the components during normal operation and can prevent the circuit from operating correctly.

There is therefore a need for a circuit arrangement that can protect voltage-sensitive components during an ESD event in a circuit having a relatively high voltage power supply.

SUMMARY OF THE INVENTION

According to a first aspect of the present invention there is provided a protection circuit for protecting components from an electrostatic discharge at a first node in an integrated circuit having a first set of electronic components of a first voltage sensitivity, the components being supplied by a second node, the protection circuit comprising: a first switching device connected between the first node and the second node; a second switching device connected between the first node and ground; a third switching device connected between the second node and ground; and detection circuitry arranged to detect an electrostatic discharge at the first node and in response to said detection control the switching devices such that; the first switching device isolates the first set of components from the first node, the second switching device provides a current path from the first node to ground, and the third switching device provides a current path between the second node and ground, bypassing the first set of components.

Preferably the first node is a power supply rail. Preferably the first node is a contact of the integrated circuit.

Preferably the second switching device is configured to hold the voltage at the first node at an overvoltage during an electrostatic discharge. Preferably the overvoltage exceeds the operating voltage of the integrated circuit. Preferably the overvoltage is at least 50 percent higher than the operating voltage of the integrated circuit.

Preferably the maximum voltage to which the first set of components are tolerant is the greatest voltage which can be supported across the first set of components for the duration of an ESD event.

Preferably the maximum voltage to which the first set of components are tolerant is the maximum rated voltage of the components of the first set. Preferably the integrated circuit further comprises a second set of electronic components of a second voltage sensitivity connected between the first node and ground. Preferably the maximum voltage at the first node to which the second set of components are tolerant is higher than the maximum voltage at the first node to which the first set of components are tolerant. Preferably the maximum voltage at the first node to which the second set of components are tolerant is the greatest voltage which can be supported across the second set of components for the duration of an ESD event. Preferably the overvoltage does not exceed the maximum voltage to which the second set of components are tolerant.

Preferably the first set of components includes transistors having single-oxide gates and the second set of components includes transistors having double-oxide gates.

Preferably the first and second switching devices are transistors of opposite polarity.

Preferably the detection circuitry is configured to detect an electrostatic discharge at the first node by detecting when the voltage at the first node exceeds a predetermined voltage.

Preferably the detection circuitry is configured to detect an electrostatic discharge at the first node by detecting when the rate of increase of the voltage at the first node exceeds a predetermined rate.

Preferably the detection circuitry is configured to provide a trigger voltage at its output when an electrostatic discharge is detected at the first node. Preferably the first switching device is a transistor and the base or gate of the first switching device is coupled to the output from the detection circuitry. Preferably the second switching device is a transistor the base or gate of the second switching device is coupled to the output from the detection circuitry.

Preferably the third switching device is a transistor and the base or gate of the third switching device is coupled to the output from the detection circuitry.

DESCRIPTION OF THE DRAWINGS

The present invention will now be described by way of example with reference to the accompanying drawings, in which.

DETAILED DESCRIPTION OF THE DRAWINGS

The following description is presented to enable any person skilled in the art to make and use the invention, and is provided in the context of a particular application. Various modifications to the disclosed embodiments will be readily apparent to those skilled in the art.

The general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Conventional ESD clamp designs for integrated circuits provide an alternative current path across the IC for conducting the charge associated with an ESD event safely through the IC. However, with such clamp designs, the components of the IC must be able to support the high voltages associated with an electrostatic event for a short period of time as the clamp conducts the charge to ground. The present invention improves on such designs by further protecting voltage-sensitive components of the integrated circuit from the electrostatic voltage—such components might otherwise be damaged by the relatively high voltage present across the ESD clamp during an ESD event. The present invention therefore increases the robustness of integrated circuits that include components having a low overvoltage tolerance.

Figure 1:
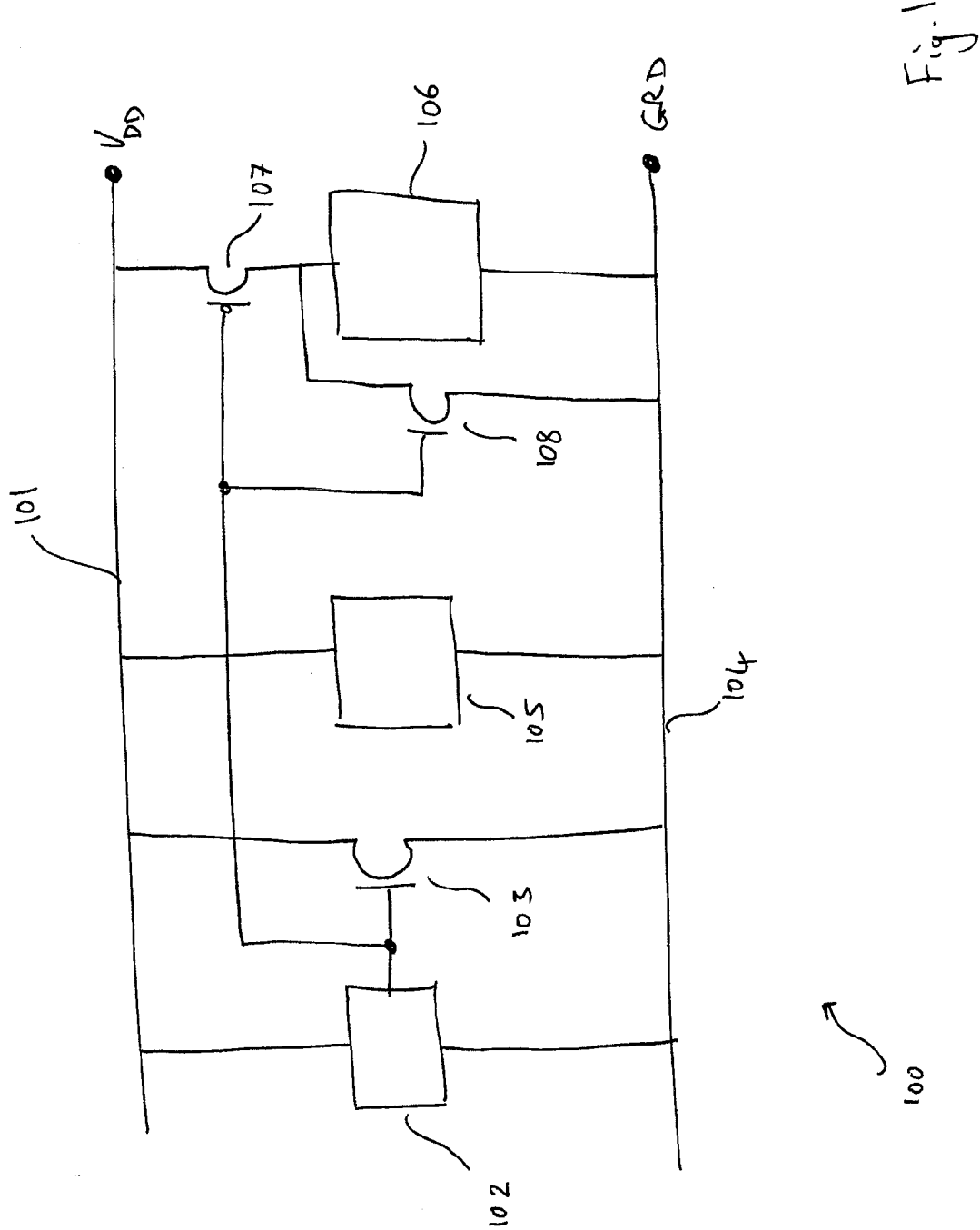
FIG. 1 shows a circuit arranged in accordance with the present invention.

A circuit configured in accordance with the present invention is shown in FIG. 1. Block 106 of integrated circuit 100 comprises components which has a low voltage tolerance. Transistor 103 is configured to conduct an electrostatic charge from power rail 101 to ground 104 when an ESD event occurs. Transistor 103 is triggered by ESD detection circuit 102, which is configured to detect an ESD event at power rail 101 (which more generally could be any node in a circuit). Circuit elements 102 and 103 may together be any kind of conventional ESD clamp which is capable of (a) detecting an ESD event and providing a suitable signal for transistor 107, and (b) conducting an ESD charge from node 101 to ground 104 without the clamp circuit suffering damage.

"Low voltage" block 106 of integrated circuit 100 comprises voltage-sensitive components which cannot be adequately protected by an ESD clamp such as that formed by circuit elements 102 and 103. In other words, the ESD clamp is unable to clamp the power supply voltage to a voltage below that which might damage the components of block 106. Transistor 107 is arranged so as to open the circuit between the power rail and low tolerance block 106 when an electrostatic discharge event occurs, thus isolating the components of block 106 from the electrostatic voltage and preventing current flow through the block.

When an ESD event occurs at power rail 101, ESD detection circuit 102 is triggered and arranged to switch on transistor 103 so as to provide a current path for the electrostatic charge from power rail 101 to ground 104. The ESD detection circuit is also arranged to switch off transistor 107 so as to isolate low tolerance block 106 from power rail 101. During normal operation of the integrated circuit, transistor 107 is on so as to couple the power supply of circuit 106 to the voltage at power rail 101.

Optionally, bypass transistor 108 may be added to provide further protection for low tolerance block 106. Bypass transistor 108 is arranged such that, when an ESD event is detected by ESD detector 102, the transistor couples the supply voltage of low tolerance block 106 to ground.

The ESD detection circuit may detect an ESD event by any means. Typically, an ESD detection circuit triggers when the voltage at the node being protected (in this case, node 101) rises rapidly in a manner indicative of an ESD event at the node. Thus, an ESD detection circuit may be configured to trigger when the rate of increase of the voltage at the node increases above a predetermined rate. This is selected to be faster than the rate of change associated with the device powering up so that the ESD clamp is not triggered when the power rails of the device turn on. For example, an ESD detection circuit might be configured to trigger when the voltage at the node increases by at least the power supply voltage in less than 1 microsecond. This is generally slow enough to catch even the slowest-rising ESD events but faster than the rise time of the power supply rails during switch-on. More typically in modern ICs, an ESD clamp is able to detect and react to an ESD event within around 1 ns.

ESD detection circuits can alternatively, or in addition to detecting the rate of change of voltage at the node, be set to trigger when the voltage at the node exceeds a predetermined voltage. For example, an ESD detection circuit might be configured to trigger when the voltage at the protected node is at least 50% (even 75 or 100%) greater than the power supply or operating voltage.

Thus, it is generally desirable for the ESD detection circuitry to be designed to be sensitive to ESD voltage profiles (a combination of AC and DC characteristics) but also to be immune to AC and DC voltages that occur during normal operation so as to ensure that the ESD clamping mechanism is not accidentally triggered by minor voltage spikes or fluctuations at the power rail. Preferably, the detection circuit should only trigger for rise times at the power rail faster than 1 us or for DC voltages greater than the maximum power supply voltage but less than the maximum voltage tolerance of the circuits to be protected—or some combination of these two parameters. There should be an acceptable margin between these parameters and the actual performance of the triggering circuit to ensure reliable operation.

A typical ESD event could last anywhere between 1 nanosecond and 1 microsecond, and is generally of the order of 100 ns. It is therefore important that components exposed to the node under protection are tolerant to (i.e. can withstand without damage) an electrostatic voltage (which can exceed 1000 V) for the length of an ESD event. Preferably, a component exposed to a node susceptible to an ESD strike is therefore able to withstand an ESD-level voltage for a time of the order of 1 nanosecond to 1 microsecond, depending on the application.

When the ESD clamp triggers and clamps the node to ground, it limits the voltage at the node to a predetermined level—this may be referred to as the overvoltage to which the components of the IC exposed to the node must be hardy. The overvoltage is determined through appropriate design of the clamping circuit.

In an ESD context, a component in an integrated circuit may be considered to be tolerant of a voltage across it if the component can support that voltage for the typical length of an ESD event (i.e. whilst the power rail/node is at an overvoltage). The maximum voltage a component is tolerant of is the voltage above which it will become irreversibly damaged if that voltage is applied for a non-instantaneous period (the length of an ESD event). A rough indication of the voltage to which a component is tolerant to is given by the maximum rated voltage of a component or circuit—this can be used as an indication of the maximum overvoltage to which an ESD clamp should be configured to clamp down to.

In the example shown in FIG. 1, when an ESD event occurs the signal provided by circuit 102 is used to (a) turn on NMOS transistor 103 that is connected between power rail 101 and ground 104, (b) turn off PMOS transistor 107 between the power rail and low tolerance circuit 106, and (c) optionally turn on NMOS transistor 108 across the low tolerance circuit. Generally, the ESD detection signal may be provided by any circuit or mechanism that is able to detect that an ESD event has occurred—the present invention is not limited to a particular detection mechanism.

When an ESD event occurs at node 101, the ESD clamp 102 and 103 limits the node voltage to the overvoltage by providing a conducting path to ground for the ESD charge. Conventionally, the ESD clamp is configured to limit the voltage to below the failure voltage of all of the components of the circuit it is protecting. By providing means 107 for isolating voltage-sensitive components 106 of the circuit, the present invention allows the ESD clamp to clamp to a voltage above that which would damage at least some of the devices in the circuit it is protecting.

The present invention therefore allows the use of voltage-sensitive components in integrated circuits that have a power supply voltage that is higher than the operating voltage of the voltage-sensitive components. During normal operation the voltage across the voltage-sensitive components is kept within the safe operating range by simple circuit design. However, during ESD events the voltage across the power supply can become very large and is clamped only when an electrostatic discharge has been detected by the ESD detection circuit.

In practice, when an ESD event occurs, low tolerance block 106 is exposed to high voltages for an instant whilst transistors 103 and 107 switch. But, ESD failure is generally much more dependent on the magnitude of the time-integrated voltage than an instantaneous potential difference. A low tolerance circuit is generally able to support a much higher (ESD-level) voltage across it for a very short time (say, 1 ns) than it can tolerate for a longer time (say, 100 ns or greater). The protection afforded by the present invention is to prevent the flow of charge associated with an ESD event from flowing through low tolerance circuit 106 by isolating the low tolerance circuit from the ESD voltage at the power rail. The advantages are therefore two-fold: protection of the low tolerance circuit from an ESD voltage and the prevention of the ESD voltage driving charge through the low tolerance circuit.

Since the voltage-sensitive components of the circuit are protected, the specifications of the ESD clamp can be relaxed, allowing the circuit designer to reduce the clamp area, its parasitic capacitance and leakage current. In other words, the ESD clamp does not have to be designed to provide a sufficiently low impedance current path to ground for it alone to protect the low tolerance components of an integrated circuit, and it generally only remains necessary to require that the clamp can pass the current associated with a typical ESD event (say, 1.5 A). For integrated circuits operating at around 3.3 V but incorporating devices that operate at around 1.5 V, the ESD clamp can be made significantly smaller when an isolating transistor 107 is used in accordance with teachings of the present invention.

In particular, the present invention can protect SO (single gate oxide), low voltage diodes, n-well resistors, thin gate oxide capacitors or other low voltage devices in an integrated circuit that is protected by a power supply clamp that is suitable for DO (double gate oxide) devices. This is becoming increasingly important as the voltage tolerance of DO and SO transistors diverges. For example, in modern integrated circuits it is common for SO devices to operate at approximately 0.9V to 1.5V and DO devices to operate at approximately 1.8V to 3.3V depending on the process options chosen at the foundry. The present invention allows the use of SO transistors in 3.3 V circuits such as radio communication chips, and linear and switched-mode power supplies. For example, in the circuit shown in FIG. 1, if low tolerance block 106 includes SO devices and high tolerance block 105 includes only DO devices, ESD detection circuit 102 and switching devices 103, 107 and (optionally) 108 preferably at least in part comprise DO transistors. It is then straightforward to arrange that ESD detection circuit 102 and transistor 103 to clamp to a voltage which is not damaging to high voltage tolerant block 105.

As well as protecting voltage-sensitive components during an ESD event in a circuit consisting of components having a higher voltage tolerance, the present invention can be implemented to allow an ESD clamp to be used which is tolerant to higher voltages or an ESD clamp that clamps to higher voltages. Thus, in FIG. 1, high tolerance block 105 need not be present and block 106 could represent all the integrated circuitry which is to be protected. Integrated circuit 106 could be used in a device having ESD clamps that are configured to limit the voltage during an ESD event to a high voltage that is greater than the voltage tolerance of all circuits on the chip. Transistor 107 would ensure that the circuits 106 are isolated from these voltages during an ESD event. This allows the IC to be used with ESD clamps having a smaller size, and low current leakage.

Figure 2:
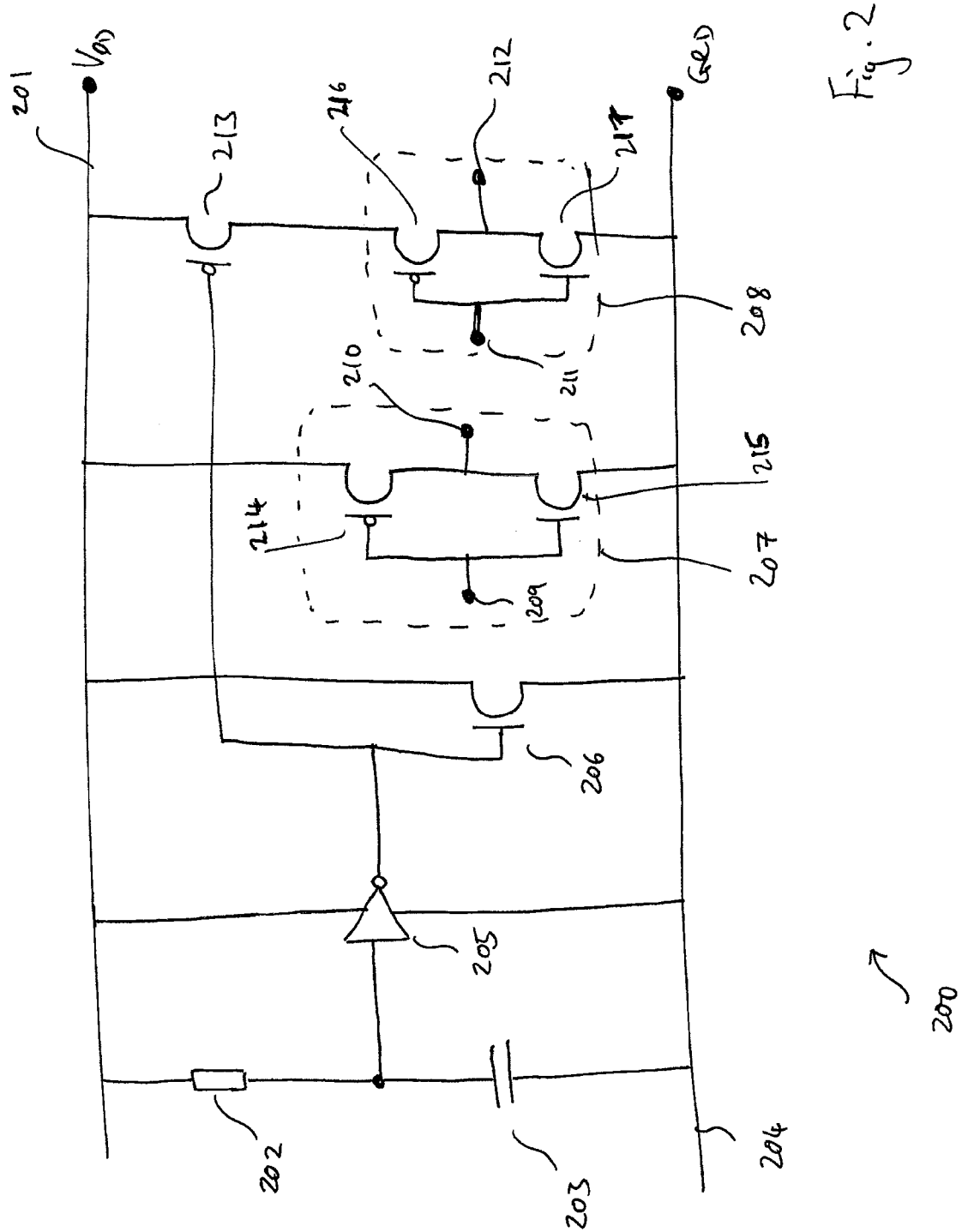
FIG. 2 shows a circuit in accordance with an embodiment of the present invention which includes an example ESD clamp.

An embodiment of the present invention is shown in FIG. 2 in which circuit elements 102 and 103 of FIG. 1 comprise a common type of ESD clamp, consisting of components 202, 203, 205 and 206. The input of inverter 205 is tied to ground by capacitor 203 and is coupled to power rail 201 by means of resistor 202 (i.e. an RC filter arrangement). When an ESD event occurs at power rail 201, the voltage on the rail increases very quickly—more quickly than the voltage at the input of inverter 205 can respond. The input of inverter 205 is therefore low and the gate of transistor 206 is high, switching on transistor 206 and shorting the electrostatic charge at the power rail to ground 204.

In FIG. 2, the (optional) high tolerance block of FIG. 1 is represented by component block 207, which is a simple amplifier (input 209, output 210) fabricated using DO transistors 214 and 215. The low tolerance block of FIG. 1 is represented by component block 208, which is also a simple amplifier (input 211, output 212) but fabricated using SO transistors 216, 217. When an ESD event occurs, the ESD clamp arrangement causes transistor 206 to close the circuit between power rail 201 and ground 204, providing a current path to ground for the electrostatic charge. The DO transistors of block 207 can withstand the electrostatic voltage at the power rail because the electrostatic charge is rapidly conducted via large transistor 206. The SO transistors of block 208 are protected from the electrostatic voltage at the power rail by transistor 213, which opens the circuit between power rail 201 and block 208 when the electrostatic event occurs and the ESD clamp is triggered.

Transistor 206 is preferably larger than transistor 213. In other words, transistor 206 should provide a high conductance path between power rail 201 and ground 204 when it is switched on so as to present a low resistance path to ground to an electrostatic charge at the power rail.

The present invention is not limited to integrated circuits comprising a mix of SO and DO devices and is applicable to providing ESD protection in any integrated circuit that comprises devices having low voltage tolerance and ESD clamps that have a high voltage across them during an ESD event.

The exemplary embodiments of the present invention have been described as using transistors in order to control the flow of electrostatic charge in the integrated circuit. However, the transistors could be any kind of switching devices configured in accordance with the present invention. The term "gate" as used herein in relation to field effect transistors should be understood to refer to the appropriate control element of the switching device. For example, the terms "gate", "source" and "drain" conventionally refer to the contacts of a field effect transistor; for the general class of transistors, these elements may be referred to as the "base", "collector" and "emitter".

Although the present invention has been described in relation to circuits having a "ground" rail, it should be understood that "ground" may refer to a lower voltage supply rail, an earth, or any suitable current path via which an electrostatic charge may flow without damaging ESD-sensitive devices— for example a casing in which the circuit is housed.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A protection circuit for protecting components from an electrostatic discharge at a first node in an integrated circuit having a first set of electronic components, the first set of electronic components having a first voltage sensitivity, the first set of electronic components being supplied with a voltage supply by a second node, the protection circuit comprising:
a first switching device connected between the first node and the second node;
a second switching device connected between the first node and ground;
a third switching device connected between the second node and ground; and
detection circuitry arranged to detect an electrostatic discharge at the first node and in response to said detection, to control the switching devices such that:
the first switching device is switched off to isolate the first set of electronic components from the first node, the second switching device provides a current path from the first node to ground, and the third switching device provides a current path between the second node and ground, bypassing the first set of components.

2. A protection circuit as claimed in claim 1, wherein the first node is a power supply rail.

3. A protection circuit as claimed in claim 1, wherein the first node is a contact of the integrated circuit.

4. A protection circuit as claimed in claim 1, wherein the second switching device is configured to hold the voltage at the first node at an overvoltage during an electrostatic discharge.

5. A protection circuit as claimed in claim 4, wherein the overvoltage exceeds the operating voltage of the integrated circuit.

6. A protection circuit as claimed in claim 5, wherein the overvoltage is at least 50 percent higher than the operating voltage of the integrated circuit.

7. A protection circuit as claimed in claim 4, wherein the overvoltage exceeds the maximum voltage to which the first set of electronic components are tolerant.

8. A protection circuit as claimed in claim 7, wherein the maximum voltage to which the first set of electronic components are tolerant is the greatest voltage which can be supported across the first set of components for the duration of an ESD event.

9. A protection circuit as claimed in claim 7, wherein the maximum voltage to which the first set of electronic components are tolerant is the maximum rated voltage of the components of the first set.

10. A protection circuit as claimed in claim 1, wherein the integrated circuit further comprises a second set of electronic components, the second set of electronic components having a second voltage sensitivity connected between the first node and ground.

11. A protection circuit as claimed in claim 10, wherein the maximum voltage at the first node to which the second set of electronic components are tolerant is higher than the maximum voltage at the first node to which the first set of components are tolerant.

12. A protection circuit as claimed in claim 11, wherein the maximum voltage at the first node to which the second set of electronic components are tolerant is the greatest voltage which can be supported across the second set of components for the duration of an ESD event.

13. A protection circuit as claimed in claim 10, wherein the second switching device is configured to hold the voltage at the first node at an overvoltage during an electrostatic discharge, wherein the overvoltage does not exceed the maximum voltage to which the second set of electronic components are tolerant.

14. A protection circuit as claimed in claim 10, wherein the first set of electronic components includes transistors having single-oxide gates and the second set of electronic components includes transistors having double-oxide gates.

15. A protection circuit as claimed in claim 1, wherein the first and second switching devices are transistors of opposite polarity.

16. A protection circuit as claimed in claim 1, wherein the detection circuitry is configured to detect an electrostatic discharge at the first node by detecting when the voltage at the first node exceeds a predetermined voltage.

17. A protection circuit as claimed in claim 1, wherein the detection circuitry is configured to detect an electrostatic discharge at the first node by detecting when the rate of increase of the voltage at the first node exceeds a predetermined rate.

18. A protection circuit as claimed in claim 1, wherein the detection circuitry is configured to provide a trigger voltage at its output when an electrostatic discharge is detected at the first node.

19. A protection circuit as claimed in claim 18, wherein the first switching device is a transistor and the base or gate of the first switching device is coupled to the output from the detection circuitry.

20. A protection circuit as claimed in claim 18, wherein the second switching device is a transistor the base or gate of the second switching device is coupled to the output from the detection circuitry.

21. A protection circuit as claimed in claim 18, wherein the third switching device is a transistor and the base or gate of the third switching device is coupled to the output from the detection circuitry.

* * * * *

UNITED STATES PATENT AND TRADEMARK OFFICE
CERTIFICATE OF CORRECTION

| | | |
|---|---|---|
| PATENT NO. | : 8,570,694 B2 | Page 1 of 2 |
| APPLICATION NO. | : 13/121987 | |
| DATED | : October 29, 2013 | |
| INVENTOR(S) | : William Pugsley | |

It is certified that error appears in the above-identified patent and that said Letters Patent is hereby corrected as shown below:

In the Specification

Column 2, Line 26; Column 2, Line 31; Column 2, Line 36; Column 2, Line 38; Column 2, Line 39
The error "set of components are tolerant" should be changed to --set of components is tolerant--

Column 2, Line 62
"transistor the base" should be changed to --transistor and the base--

Column 3, Line 41
"components which has" should be changed to --components which have--

In the Claims

Claim 7: Column 8, line 13-- The error "set of components are tolerant" should be changed to
--set of components is tolerant--

Claim 8: Column 8, line 16-- The error "set of components are tolerant" should be changed to
--set of components is tolerant--

Claim 9: Column 8, line 21-- The error "set of components are tolerant" should be changed to
--set of components is tolerant--

Claim 11: Column 8, line 30 and Column 8, line 32-- The error "set of components are tolerant"
should be changed to --set of components is tolerant--

Claim 12: Column 8, line 35-- The error "set of components are tolerant" should be changed to
--set of components is tolerant--

Signed and Sealed this
Eleventh Day of August, 2015

Michelle K. Lee
*Director of the United States Patent and Trademark Office*

Claim 13: Column 8, line 43-- The error "set of components are tolerant" should be changed to --set of components is tolerant--

Claim 20: Column 9, line 2-- "transistor the base" should be changed to --transistor and the base--